Sept. 8, 1970 D. H. PRITCHARD 3,527,879
COLOR IMAGE PROJECTION SYSTEM
Filed Oct. 9, 1967 2 Sheets-Sheet 2
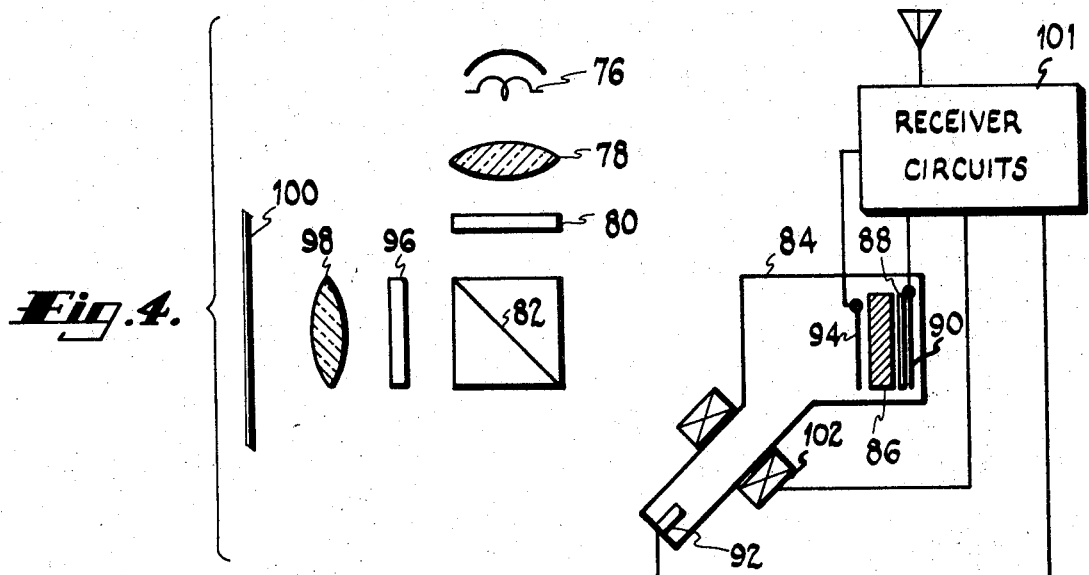
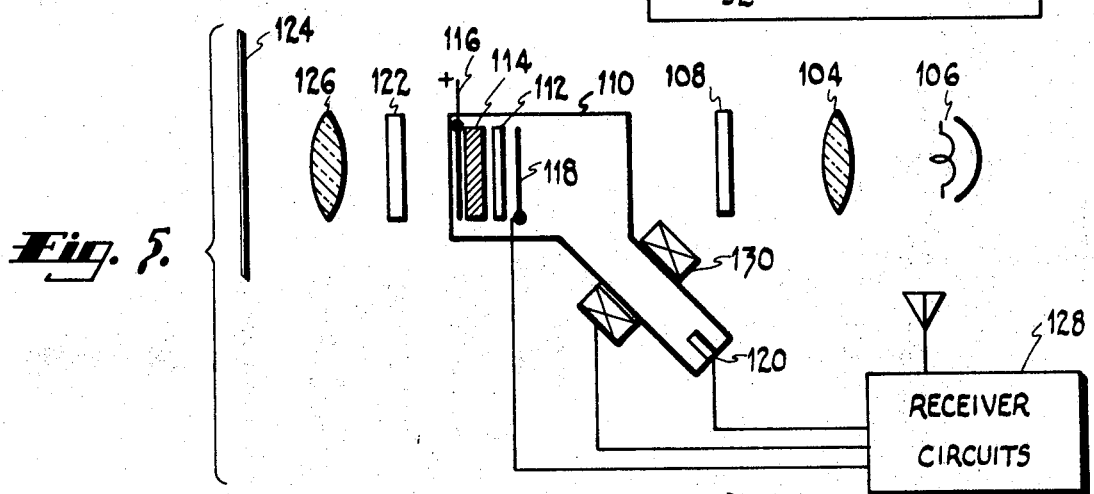
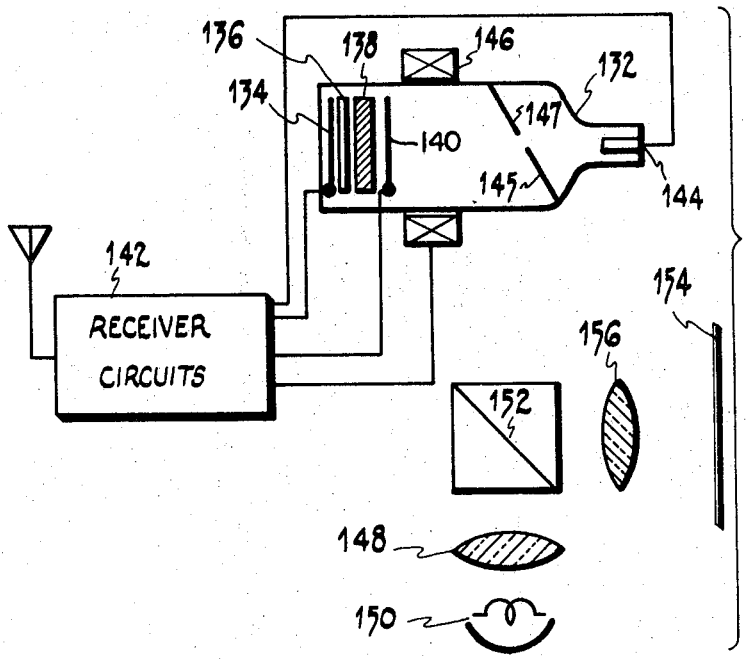
INVENTOR
DALTON H. PRITCHARD
BY William H. Meagher
ATTORNEY

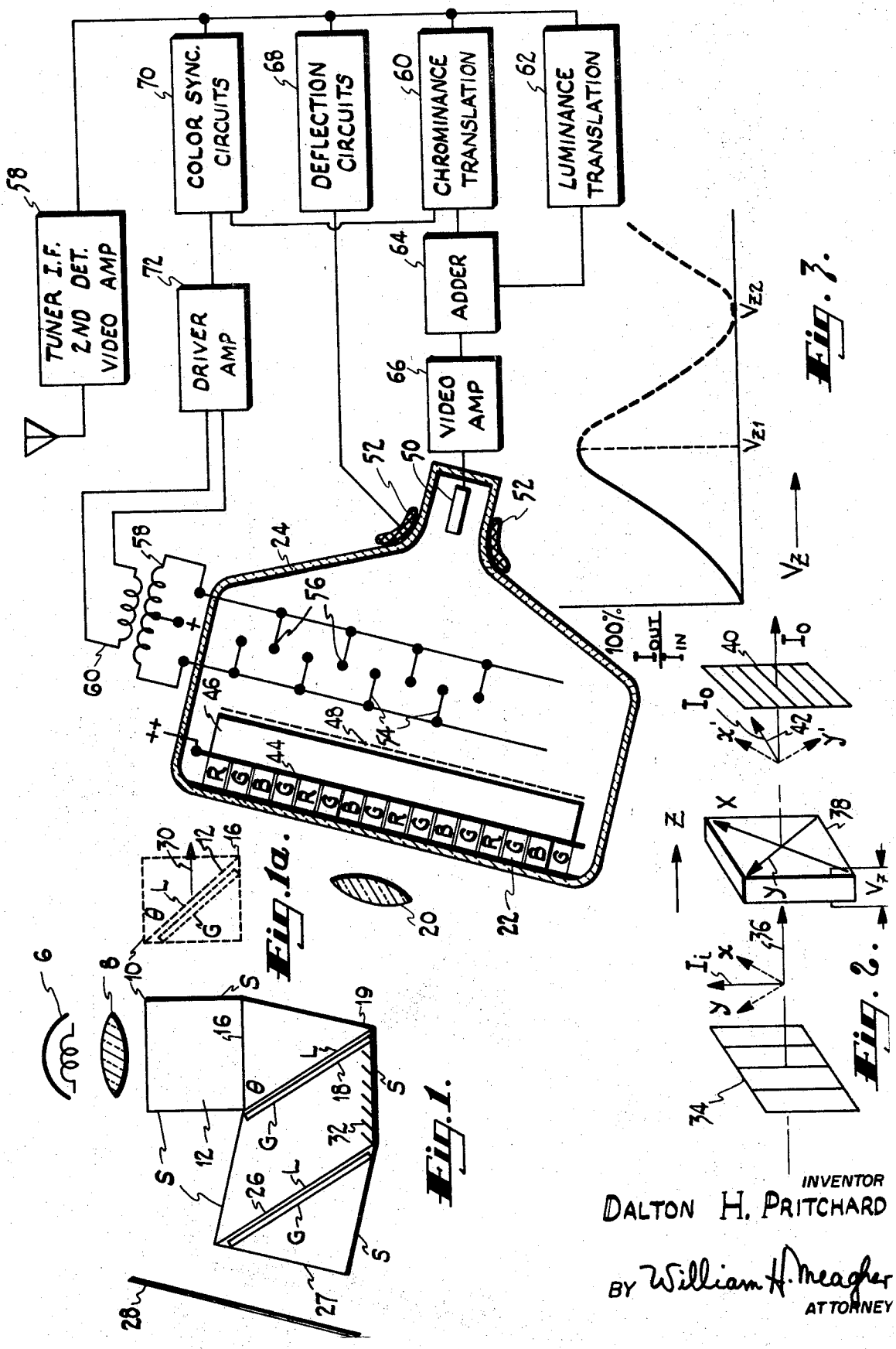

United States Patent Office 3,527,879
Patented Sept. 8, 1970

3,527,879
COLOR IMAGE PROJECTION SYSTEM
Dalton H. Pritchard, Princeton, N.J., assignor to RCA
Corporation, a corporation of Delaware
Filed Oct. 9, 1967, Ser. No. 673,616
Int. Cl. H04n 5/74, 9/16
U.S. Cl. 178—5.4                6 Claims

ABSTRACT OF THE DISCLOSURE

In a color image projection system utilizing a single light source and a single electro-optical element, charge patterns corresponding to the intensity of each component color are deposited in mutually exclusive coextensively distributed areas on a surface of a layer of electro-optical material so as to change the polarization of light passing through the layer and thus change the amount of light passing through an analyzer and color selective filters. The color selective filters cause the light passing therethrough to correspond to the color represented by the charge patterns.

---

This invention relates to an electrically controlled color image projecting system utilizing polarized light.

Panchromatic image projection systems have been suggested in which means are inserted in a plane between a polarizer and an analyzer for effectively rotating the plane of polarization of light from point to point, thereby varying the amount of light from each point that passes through the analyzer. An image is formed by imaging the plane of the polarization rotation means onto a viewing screen. The means for effectively rotating the plane of polarization can be a flat crystal comprised of any linear electro-optical material or of certain quadratic electro-optical materials mounted in and transversely to the path of the light between the polarizer and the analyzer. One side of the crystal is scanned with an electron beam that is intensity modulated as a function of the brightness of the scene to be projected and the other side of the crystal is maintained at a reference potential. If the crystal is properly oriented, the electrostatic field thus produced through it will effectively rotate the plane of polarization of the light passing through each point by an angle that depends on the strength of the electrostatic field as determined by the amount of electron charge placed at that point by the beam.

In order to project images in color, it has been suggested that a separate projection system of the type described to provided for each component color. However, this introduces problems of raster scan, electrical, and optical registration as well as adding considerably to the cost.

Accordingly, it is an object of this invention to provide a single projection system utilizing electro-optical materials for producing images in color.

This objective can be achieved in accordance with this invention by producing charge patterns on one surface of an electro-optical layer which are related to the brightness of each component color, the charge pattern for each component color occupying a different group of mutually exclusive co-extensively distributed areas. A beam of polarized light is passed through the layer at least once, and a projection lens and analyzer are mounted in sequence in the path of the beam emerging from the layer. Optical color selection means are used to cause the color of the light in the groups of areas as they appear in the projected image to correspond to the color represented by the charge pattern in each group of areas on the layer of electro-optical material.

The novel features of the invention are set forth with particularity in the appended claims. The invention, both as to its organization and manner of operation, may best be understood by reference to the following description, taken in conjunction with the accompanying drawings, in which:

FIG. 1 illustrates a plan view of a projection system in which a polarized beam of light directed to one surface of a layer of electro-optical material is reflected back through the layer, and in which the charge patterns are formed on the opposite surface of the layer;

FIG. 1A is a side view of a portion of FIG. 1;

FIGS. 2 and 3 are presented for the purpose of explaining how a layer of electro-optical material can effectively rotate the plane of polarization of a beam of light;

FIG. 4 illustrates a projection system in which a beam of polarized light is directed to the surface of a layer of electro-optical material on which the charge patterns are formed and in which the light is reflected back through the layer;

FIG. 5 illustrates a projection system in which a beam of polarized light passes through the layer of electro-optical material once; and FIG. 6 illustrates a projection system in which coaxial light and electron beams approach the target from the same side.

In FIG. 1 light from a source 6 is collected by a lens 8 and directed normally to a vertical transparent glass window 10. A polarizing interference mirror 12, that serves as a prepolarizer, is mounted at a Brewster angle $\theta$ with respect to the vertical surface 10, as indicated in FIG. 1A, the bottom edge of the mirror 12 being shown at 16. Vertically polarized light passes through the mirror 12 and strikes a vertical polarizing interference mirror 18 that serves as a polarizer and as an analyzer. The mirror 18 is at the Brewster angle $\theta$ with the bottom edge 16 of the mirror 12. Vertically polarized light that passes through the mirror 12 is reflected by the mirror 18 through a window 19 and a projection lens 20 to the faceplate 22 of a cathode ray tube 24. The lens 8 and the projection lens 20 form a beam of light that floods the faceplate 22. In a manner to be described, light is reflected by a mirror in the tube 24 back through the projection lens 20 to the mirror 18. If the plane of polarization of this reflected light has not been effectively rotated, it is reflected by the mirror 18 back to the source 6. However, if the plane of polarization of the reflected light has been rotated by an angle $\beta$, an amount of light proportional to the sine $\beta$ passes successively through an analyzer, comprised of the mirror 18 and a parallel mirror 26, which serves as a post analyzer, and through a window 27 to a viewing screen 28. The projection lens 20 images the inside surface of the faceplate 22 onto the viewing screen 28, but the intensity of the light reaching the screen is dependent on the angle through which its plane of polarization has been effectively rotated. The lens 20 may be mounted on either side of the analyzer 18. It will be appreciated that the drawing is not in proportion in order that certain structural details can be conveniently illustrated.

The structure containing the mirrors 12, 18 and 26 includes vertical sidewalls S that are opaque to light and respective vertical transparent windows 10, 19 and 27. Although now shown, an opaque top and bottom complete an enclosure which is filled with oil having the same index of refraction as the windows 10, 19 and 27 in order to reduce reflections. The mirrors are comprised of about 6 layers L of material mounted on a plate of glass G having the same index of refraction as the oil and the windows. The mirrors 12, 18 and 26 may be constructed in accordance with techniques set forth in an article beginning on page 792 of the Journal of The American Optical Society, vol. 37, (1947).

Light efficiency is also increased by the use of anti-reflection coatings on the outside surfaces of the windows 10, 19 and 27. The angle θ of the mirror 12 is equal to Brewster's angle for the relative indices of refraction of the oil and the outer lamination of the mirror with which it is in contact. Therefore, a certain portion, about 15%, of the horizontally polarized components of the unpolarized light striking the mirror 12 is reflected downwardly by the outer lamination of the mirror, as indicated by the arrow 30 in FIG. 1A. Alternate laminations have different indices of refraction such that the light passing through one lamination strikes the next at a Brewster angle, which is different from the angle θ. Thus each lamination reflects a certain portion, about 15%, of the horizontally polarized components of the light reaching it, in a downward direciton indicated by the arrow 30. If enough laminations are provided, a large percentage of the horizontally polarized components can be reflected and thus removed from the beam of light that is to be used for projecting the image.

The vertically polarized components of the light pass through the mirror 12 to a similarly constructed mirror 18 which is mounted at the Brewster angle θ for the oil and the outer lamination. Because the mirror 18 is vertical, it reflects the vertically polarized components of the light impinging on it in the same manner as the mirror 12 reflected the horizontally polarized components. A large portion of the small amount of horizontally polarized components that undesirably pass through the mirror 12 also pass through the mirror 18 to a light trap structure 32. As previously stated, if the polarization of the light reflected by a mirror in the cathode ray tube 24 is not rotated, it is still vertically polarized and is reflected by the mirror 18 back to the source 6. If the polarization is rotated by action of the cathode ray tube 24, it has a horizontally polarized component which passes through the mirror 18 and the parallel mirror 26. In order to avoid refraction, the windows 10 and 19 and 27 are perpendicular to the direction of propagation of the light passing through them.

Reference is now made to FIGS. 2 and 3 for an explanation of the principles utilized by the cathode ray tube 24 in effectively rotating the plane of polarization of the light. A polarizer 34 permits vertically polarized light to pass in a direction indicated by the arrow 36 that is perpendicular to the plane of an electro-optical crystal 38 and parallel to its axis. The crystal 38 could be made of material such as KDP. The vertically polarized light $I_1$ may, like any other vector quantity, be resolved into orthogonal components $x$ and $y$ that are 45° on either side of it. All of these vectors may be considered to be varying sinusoidally in amplitude at a frequency determined by the wavelength λ of the light involved. With the crystal 38 properly oriented, and with no voltage applied along its z axis, the light emerging from the crystal 38 remains vertically polarized so that it does not pass through the horizontally polarized analyzer 40. If a voltage $V_z$ is applied across the crystal 38 in the z direction, the components polarized in the $x$ direction pass through the crystal at a different velocity than the components polarized in the $y$ direction so that the amplitude variations of these components as they emerge from the crystal are no longer in phase. The mathematical analysis of the phenomena involves the use of the Fresnel index ellipsoid. At a predetermined voltage, $V_{z1}$, the passage of the $y$ component through the crystal 38 is delayed with respect to the $x$ component by an amount of time equal to one-half of the period in which an electrical vector of the light goes through a complete cycle of amplitude variation. The original $x$ and $y$ components now have a relationship as indicated by $x'$ and $y'$ wherein the $y'$ vector is rotated 180° with respect to the $y$ vector. The resultant of $x'$ and $y'$ vectors is a vector 42 that represents the horizontally polarized light $I_0$ that is passed by the analyzer 40. As shown in FIG. 3, the ratio $I_0/I_1$ increases to a maximum as $V_z$ varies from zero to $V_{z1}$, and as $V_z$ increases beyond this point, the delay of the $y'$ component relative to the $x'$ component changes the angle between them and reduces their resultant. When $V_z$ causes a delay equal to the period of vibration of an electrical vector of the light involved, the $x'$ and $y'$ components of the emerging light have the same relationship as the original $x$ and $y$ components so that the light is vertically polarized and does not, therefore, pass through the analyzer 40. Accordingly, full modulation can be achieved between $V_z=0$ and $V_z=V_{z1}$.

Referring again to FIG. 1, the vertically polarized beam of light reflected by the mirror 18 passes successively through the faceplate 22 of the cathode ray tube 24 to a target structure comprised of parallel red, green and blue optical filter strips R, G and B (shown in end view), a sheet of transparent conductive material 44 and a layer of electro-optical material, herein shown as an electro-optical crystal 46. Electro-optical crystals and their utilization in television systems are described in chapter 8, "Picture-Reproducing Systems," of the text Television by V. K. Zworykin and G. A. Morton, second edition, published 1954 by John Wiley & Sons, Inc. It is reflected by a segmented mirror 48 formed of separate areas of electrically conductive material such as aluminum. The projection lens 20 focuses the plane of the filter strips R, G and B onto the viewing screen 28. The strips should be narrow enough and the "pitch" of the strips should be such that their images on the screen are not the limiting factor in the resolution of the system. The z axis of the crystal 46 is parallel to the direction of propagation of the beam of light approaching the faceplate 22, and the $x$ and $y$ axes of the crystal are at 45° with respect to the vertical polarization plane, just as illustrated in FIG. 2. The strips can be made by forming a color positive transparency photograph of the desired signal of relatively large R, G and B strips.

Independent modulation of the intensity of the red, green and blue component colors of the light that reaches the viewing screen 28 is achieved by means for producing voltage gradients between the surfaces of the crystal 46 that are related to the intensity of that particular component color in the mutually exclusive coextensively distributed areas of the crystal 46 aligned with the R, G and B filters. In this particular embodiment of the invention, the voltage gradients are created by means producing a reference potential on one surface of the layer of electro-optical material 46 and charge patterns related to the brightness of each component color of the images to be projected on the other surface, the charge pattern for each component color occupying a different group of the mutually exclusive coextensively distributed areas.

An ultor, or reference voltage, is applied to the transparent conductive coating 44, and a beam of electrons projected by an electron gun 50 is deflected by a yoke 52 so as to scan a raster area on the rear surface of the crystal 46 and mirror 48. The direction of the scanning lines is preferably transverse to the filter strips R, G and B. Sets 54 and 56 of interleaved parallel grid wires are mounted in a plane parallel to the crystal and 64 displaced from the beam side thereof. The grid wires in set 54 are connected to one end of a secondary winding 58 of a transformer, and the grid wires in set 56 are connected to the other end so that when the primary winding 60 is energized with a switching signal, the relative polarity of potential of the sets of grid wires 54 and 56 changes once during each cycle. The grid wires in the sets 54 and 56 are respectively aligned with the centers of the strips R and B so that the green strips G are midway between each grid wire in the set 54 and the adjacent grid wire in the set 56.

A D.C. potential, less positive than that applied to the conductive coating 44, may be applied to the secondary winding 58 so as to produce a focusing action in the beam segments that pass between the wires. When the switching signal applied to the transformer 60 goes through its A.C. axis, both sets of grid wires 54 and 56 are at this D.C. potential, and the beam segments passing between them strike the green phosphor strips G. During one half cycle of the switching signal, the grid wires in the set 54 are positive with respect to the grid wires in the set 56 so that the beam segments are deflected to the area behind the red filter strips R, and during the other half cycle, when wires in the set 54 are negative with respect to the wires in the set 56, the beam segments are deflected to the areas behind the blue filter strips B. It is necessary that the intensity of the electron beam be controlled in accordance with the intensity of the same color as the filter strip opposite to or in registry with the point where the beam strikes the crystal 46.

With the electron beam cut off, the entire crystal 46 assumes the ultor or reference potential applied to the transparent conductive coating 44 by virtue of leakage current through the bulk and surface resistivities of the crystal 46. When the beam is present, a positive or negative net charge will be deposited on the rear surface of the crystal 46, depending on whether the ultor potential applied to the conductive coating 44 is set below or above the unity secondary emission ratio voltage for the segments of the mirror 48. The charge placed on the surface of the crystal 46 between segments of the mirror 48 has no effect on the light in the projected image as no light is reflected by those areas. The charge on the segments of the mirror 48 produces a voltage gradient through the crystal 46 along its z axis. The magnitude of the gradient and the resulting effective rotation of the polarization of the light passing through the crystal 46 is related to the strength of the charge and accordingly to the intensity modulation of the electron beam.

The design of the circuits for supplying video signals to the electron gun 50 so as to modulate the beam with component color signals in the same sequence as the filter strips R, G, B, G are scanned by the electron beam, depends on the type of signal transmitted and has been discussed for the signals used in the U.S.A. in a book entitled "Principles of Color Television" prepared by the staff of Hazeltine Incorporated, published by John Wiley & Sons, Inc. and copyrighted in 1956. In this book, circuits are also discussed for providing signals having a different sequence, and if these are used, the sequence of the filters R, G, B could be changed accordingly. It is also possible to use horizontal strips that are aligned with the scanned lines of the raster, in which event a cyclic vertical deflection is superimposed on the normal vertical deflection so as to cause the beam to cross the R, G, B strips many times during the scanning of each line. In any color television system each component color signal can be detected and applied by electronic switching means to the gun 50 in any desired sequence.

The block diagram portion of FIG. 1 generally illustrates the relationship between the various circuits. Video signals are derived by the portion 58 of a receiver that includes a tuner, I.F. amplifier, second detector, and video amplifier and are applied to a chrominance translator 60 and to a luminance translator 62. The desired sequence of red, green and blue color signals is produced by combining the outputs of the translators 60 and 62 in an adder 64. Thse sequential color signals are amplified in a video amplifier 66 and applied so as to modulate the intensity of the beam of the electron gun 50. It will be appreciated from FIG. 3 that the light modulation is not a linear function of the voltage across the crystal layer 46 and therefore not a linear function of the beam intensity. Linearity can be achieved by shaping the transfer characteristic of the video amplifier 66 in a suitable manner.

The video signals are also supplied to deflection circuits 68 that drive the deflection yoke 52 and to a color synchronizing circuit 70 that extracts the color synchronizing burst and provides a continuous color reference wave at the frequency of the color subcarrier that is used in the chrominance translator 60. A driver amplifier 72 supplies the reference wave to the primary winding 60 where it is used as a switching signal for the sets of grid wires 54 and 56. In some cases such as where the color signals are separately detected and applied to the gun 50 at a sequential rate that is not necessarily related to the frequency of the color subcarrier, the switching signal may have a frequency different from that of the reference wave, in which event the driver amplifier 72 could be a harmonic amplifier, for example, or could utilize other frequency changing devices.

Various changes in the structure of FIG. 1 can be made without departing from the scope of this invention. If the mirror 48 is made of an electrically conducting material, it must be segmented in order to prevent the charges created by the electron beam from spreading uniformly over the entire rear surface of the crystal 46. If the mirror 48 is a dielectric type, it could be made in a continuous sheet covering the entire rear surface of the crystal 46.

Optical color selective means that limit the light in the different groups of mutually exclusive coextensively distributed areas as they appear in the projected image to the component color represented by the charge pattern within these respective groups of areas can take other forms than the filter strips R, G, B mounted as shown. The strips could be mounted between the rear surface of the crystal 46 and the mirror 48, whether the latter is of the segmented or continuous type. Then too, the mirror 48 could be comprised of parallel strips of dichroic material that selectively reflect the different component colors. It is also possible to perform color selection by making the screen 28 of parallel strips that reflect the different component colors, but this would require precise registration with the projected image in order that the panchromatic light modulated in accordance with the intensity of each component color will fall on a reflecting strip of the same color.

In FIG. 1, the light source 6, the lens 8 and the mirrors 12 and 18 constitute means for directing a beam of polarized light onto the faceplate 22 of the cathode ray tube 24. The mirror 18 also analyzes the light reflected to it from the mirror 48, and it is augmented in this function by the parallel mirror 26. The mirror 18 could be of the semi-transparent type so that it does not perform the polarizing and analyzing functions, in which event these functions would be respectively provided by the prepolarizer 12 and post analyzer 26, but the light efficiency of the system would be reduced.

In FIG. 4 light from a source 76 is formed by a lens 78 into a beam that passes via a polarizer 80 and a half silvered mirror 82 to a target structure of the cathode ray tube 84. In this particular illustration, the target structure is comprised of a layer 86 of electro-optical material, parallel filter strips 88, like the R, G, B strips of FIG. 1, and a mirror 90 of electrically conductive material. The filter strips 88 could be placed on the other surface of the layer 86 from that shown. The mirror 90 could be a dielectric type, in which case means such as transparent conductive coating would be needed in order to provide a reference potential to the surface of the layer 86. An off axis electron gun 92 directs a beam of electrons to the surface of the layer 86 that is nearer to the source of light, and a grid structure 94, constructed and oriented in a manner similar to the grid sets 54, 56 of FIG. 1, is mounted between the layer 86 of electro-optical material and the gun 92. Light reflected by the mirror 90 passes through the filter strips 88, the layer 86, the grid structure 94 and the half silvered mirror 82 to an analyzer 96. A projection lens 98 images the layer 86 on a viewing screen 100. All the optical components described in connection with FIG. 4 that are exterior to the cathode ray tube 84 could be replaced by those described in connection with FIG. 1.

Receiver circuits contained within a rectangle 101 operate in the same way as those discussed in connection with FIG. 1 to provide; video signals to the electron gun 92 that represent the intensities of the component colors in a desired sequence; deflection currents for a yoke 102 that cause the electron beam to scan an area on the nearer surface of the layer 86; and color control signals to the grid structure 94 that directs the beam segments passing through it to areas on the adjacent surface of the layer 86 that are in registry with the filter strips 88 in synchronism with the video signal supplied to the gun 92. Because the electron gun 92 is mounted off axis, it may well be desirable to provide keystone scanning correction circuits. A reference potention is applied to the mirror 90.

In the projection systems illustrated in FIGS. 5 and 6, the light passes through the optical layer once instead of twice as in the system of FIGS. 1 and 4. In FIG. 5 a lens 104 forms a beam of light from a source 106 and directs it through a polarizer 108 to the target of a cathode ray tube 110. The target is comprised of parallel red, green and blue filter strips 112, a layer 114 of electro-optical material, and a transparent sheet 116 of electrically conductive material. A grid structure 118, similar to grid sets 54, 56 of FIG. 1 is interposed between the target and an off axis electron gun 120. Light emerging from the cathode ray tube 110 having the same polarization as an analyzer 122, is focussed so as to form an image on a viewing screen 124 by a projection lens 126. Receiver circuits that are similar to those described in connection with FIG. 1 are included in a rectangle 128 and serve to apply the sequential color video signals to the gun 120, deflection currents to a yoke 130 and color control signals to the grid structure 118. As in the system of FIG. 4, keystone scanning correction circuits may be desirable. A reference potential is applied to the sheet 116.

In FIG. 6 the target of a cathode ray tube 132 is similar to that shown in FIG. 4 and includes an electrically conductive mirror 134, parallel R, G, B optical filter strips 136, a layer 138 of electro-optical material and a color selection grid structure 140. Receiver circuits 142, similar to those described in connection with FIG. 1 supply sequential color signals to an electron gun 144, deflection currents to a yoke 146, color switching signals to the grid structure 140 and an ultor potential to the mirror 134. After electrons from the gun 144 pass through a small opening 145 in a 45° mirror 147, they are deflected so as to scan a raster on the layer 138 of electro-optical material by the deflection yoke 146. A lens 148 forms a beam of light from light emitted by a source 150 and directs the beam through a polarizing interference mirror 152 that reflects light of one polarization and permits light of the orthogonal polarization to pass to the mirror 147 from which it is reflected to the layer of electro-optical material 138. Light reflected back through the layer 138 from the mirror 134 is reflected by the mirror 147 to the mirror 152 which reflects an amount of light that depends on the degree of rotation of polarization caused by the two electro-optical layer surfaces 138. This reflected light is projected into a viewing screen 154 by a projection lens 156.

What is claimed is:

1. Apparatus for projecting images in color comprising in combination,
    a double surface layer of electro-optical material,
    means producing on one surface of said layer charge patterns related to the brightness of each component color of the image to be projected, the charge patterns for each component color occupying a different group of mutually exclusive, coextensively distributed areas,
    means applying a reference potential to the other surface of said layer,
    means directing a beam of polarized light through said layer of electro-optical material,
    an analyzer and an imaging lens mounted in sequence in the path of the light emerging from said layer, and
    optical color selection means causing the light in the different groups of areas as they appear in a projected image to correspond to the color represented by the charge pattern in each group of areas on said layer.

2. Apparatus for projecting images in color comprising in combination,
    a double surface layer of electro-optical material,
    means producing on one surface of said layer charge patterns related to the brightness of each component color of the image to be projected, the charge pattern for each component color occupying a different group of mutually exclusive, coextensively distributed areas,
    means applying a reference potential to the other surface of said layer,
    means for forming and directing a beam of polarized light onto a surface of said layer of electro-optical material,
    a mirror mounted on the surface of said layer of electro-optical material opposite to that on which the light is directed,
    an analyzer and an imaging lens mounted in sequence in the path of light reflected by said mirror, and
    optical color selection means causing the light in the different groups of areas as they would appear in a projected image to correspond to the color represented by the charge pattern in each group of areas on said layer.

3. Apparatus for projecting images in color comprising in combination,
    a double surface layer of electro-optical material,
    means producing on one surface of said layer charge patterns related to the brightness of each component color of the image to be projected, the charge patterns for each component color occupying a different group of mutually exclusive, coextensively distributed areas,
    means applying a reference potential to the other surface of said layer,
    means for forming and directing a beam of polarized light onto a surface of said layer of electro-optical material,
    an analyzer and an imaging lens mounted in sequence in the path of light transmitted through said layer of electro-optical material, and
    optical color selection means causing the light in the different groups of areas as they would appear in a projected image to correspond to the color represented by the charge pattern in each group of areas on said layer.

4. Apparatus for projecting images in color in response of electrical signals comprising in combination,
    a cathode ray tube having a target structure,
    an electron gun directing a beam of electrons toward said target structure,
    deflection means for causing said electron beam to scan an area of said target,
    first and second sets of parallel grid wires in a plane interposed between said gun and target and nearer said target,
    said target structure being comprised of:
        (a) a double surface layer of electro-optical material having one surface spaced from and parallel to the plane of said grid wires,
        (b) a mirror mounted on said one surface,
        (c) a transparent current conducting member mounted on the surface of said layer opposite to said one surface,
        (d) a set of parallel optical filter strips for each component color of the image, said strips being mounted on a surface of said layer and parallel to said grid wires, means for applying a reference potential to said transparent conducting member, means for providing signals that represent the component colors of an image in a given sequence, and means for applying them so as to modulate the intensity of said electron beam, means for changing the relative potentials of said first and second groups of grid wires so as to direct the electron beam passing therethrough to areas of the mirror surface of said electro-optical layer that are in registry with a color filter strip that passes the color represented by the intensity modulation of the beam, means for forming a beam of polarized light and directing it onto the surface of said electro-optical layer that is remote from said grid wires, and an imaging lens and an analyzer mounted in sequence in the path of light reflected from said mirror back through said layer of electro-optical material.

5. Apparatus for projecting images in color comprising in combination, a cathode ray tube having a target structure, an electron gun for directing a beam of electrons toward said target structure, means for deflecting said beam of electrons so that it scans an area of said target structure, first and second sets of parallel grid wires in a plane interposed between said gun and said target, and nearer to said target, said target structure being comprised of:
(a) a double surface layer of electro-optical material having one surface spaced from and parallel to the plane of said grid wires,
(b) a mirror mounted on the other surface of said layer,
(c) means for conveying a reference potential to said other surface of said layer,
(d) a set of parallel optical filter strips for each component color of the image, said strips being mounted on a surface of said layer, means for providing signals that represent the component colors of an image in a given sequence, and means for applying them to said electron gun so as to modulate the intensity of said electron beam, means for changing the relative potentials of said first and second sets of grid wires so as to direct the electron beam passing therethrough to areas on said one surface of said layer of electro-optical material that are in registry with color filter strips that pass the color represented by the intensity modulation of the beam, means forming a beam of polarized light and directing it through said grid wires onto said layer of electro-optical material, and an imaging lens and an analyzer mounted in sequence in the path of light reflected by said mirror.

6. Apparatus for projecting images in color comprising in combination, a cathode ray tube having a target structure, an electron gun for directing a beam of electrons toward said target structure, means for deflecting said beam of electrons so that it scans an area of said target structure, first and second sets of parallel grid wires in a plane interposed between said gun and said target, and nearer said target, said target structure comprising:
(a) a double surface layer of electro-optical material having one surface spaced from and parallel to the plane of said grid wires,
(b) a sheet of transparent electrically conductive material on the other surface of said layer,
(c) a set of parallel optical filter strips for each component color of the image, said strips being mounted on a surface of said layer, means for applying a reference potential to said sheet of electrically conductive material, means for providing signals that represent the component colors of an image in a given sequence, and means for applying them to said electron gun so as to modulate the intensity of said electron beam, means for changing the relative potentials of said first and second sets of grid wires so as to direct the electron beam passing therethrough to areas on said one surface of said layer of electro-optical material that are in registry with color filter strips that pass the color represented by the intensity modulation of the beam, means forming a beam of polarized light and directing it through said grid wires onto said one surface of said layer of electro-optical material, and an imaging lens and an analyzer mounted in sequence in the path of light transmitted through said layer of electro-optical material.

References Cited

UNITED STATES PATENTS

| 2,276,360 | 3/1942 | Von Ardenne | 350—150 XR |
| 2,983,824 | 5/1961 | Weeks et al. | 350—150 XR |
| 3,396,305 | 8/1968 | Buddecke et al. | 315—12 |

ROBERT L. GRIFFIN, Primary Examiner

R. L. RICHARDSON, Assistant Examiner

U.S. Cl. X.R.

350—150

UNITED STATES PATENT OFFICE
CERTIFICATE OF CORRECTION

Patent No. 3,527,879      Dated September 8, 1970

Inventor(s) Dalton H. Pritchard

It is certified that error appears in the above-identified patent and that said Letters Patent are hereby corrected as shown below:

In Column 3, line 16, delete "direciton" and substitute therefor -- direction --. Column 4, line 14, delete "verticaily" and substitute therefor -- vertically --; line 62, delete "crystal and 64" and substitute therefor -- crystal 46 and --. Column 5, line 65, "Thse" should read -- These --. Column 7, line 14, "potention" should read -- potential --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents